United States Patent Office 3,573,316
Patented Mar. 30, 1971

3,573,316
2-ALKANOYLMETHYL - 1,3,4,9b - TETRAHYDRO-2H-INDENO[1,2-c]PYRIDINE SALTS AND INTERMEDIATES THEREFOR
Anton Ebnother, Arlesheim, and Jean-Michel Bastian, Birsfelden, Switzerland, assignors to Sandoz Ltd. (also known as Sandoz AG), Basel, Switzerland
No Drawing. Filed June 18, 1969, Ser. No. 834,523
Claims priority, application Switzerland, June 25, 1968, 9,435/68; Apr. 2, 1969, 5,040/69
Int. Cl. C07d 29/20
U.S. Cl. 260—294.7          3 Claims

ABSTRACT OF THE DISCLOSURE

The invention concerns novel acid addition salts of compounds of formula:

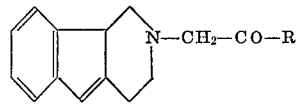

in which R signifies lower alkyl.

Processes and intermediates employed for the production of the above compounds are also described.

The above compounds possess useful antidepressant activity.

IMPROVEMENTS IN OR RELATING TO ORGANIC COMPOUNDS

The present invention relates to acid addition salts of new compounds of general Formula I,

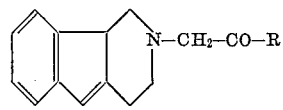

in which R signifies a lower alkyl radical, a process for their production and pharmaceutical preparations containing same. The compounds of general Formula I have one or more asymmetric carbon atoms and may therefore be obtained as racemates, as mixtures of racemates or in the form of their optical antipodes. The invention extends to the compounds of general Formula I in all their stereoisomeric forms.

An acid addition salt of a compound of general Formula I may, in accordance with the invention, be produced by removing water from a compound of general Formula II,

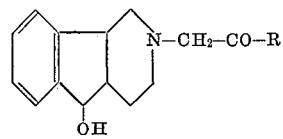

in which R has the above significance,
by treating with a strong acid or halide of a strong acid.

Strong acids which may be used for the removal of water are mineral acids, e.g. hydrochloric, sulphuric or phosphoric acid, or organic acids, e.g. methanesulphonic or benzenesulphonic acid, and suitable acid halides of strong acids include thionyl chloride and methanesulphochloride. The removal of water is conveniently effected by heating the reaction components in a solvent which is inert under the reaction conditions. After the reaction is completed the resulting salts of the compounds of general Formula I may be isolated and purified in manner known per se.

The compounds of general Formula I are stable in the form of their acid addition salts. In the form of free bases, however, the rearrangement of the compounds of general Formula Ia,

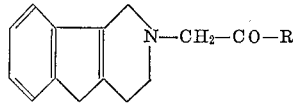

in which R has the above significance, occurs with a shifting of the double bond. The compounds of general Formula I are therefore isolated in the form of acid addition salts.

Optically active antipodes may be produced by employing optically active compounds of general Formula II; the production of racemic compounds may be effected by employing racemic compounds of general Formula II as starting materials.

The acid addition salts of the compounds of general Formula I are usually crystalline compounds. Suitable acids for salt formation are, e.g., hydrochloric, sulphuric, phosphoric, methanesulphonic and benzenesulphonic acid.

Other salts aside from those obtained with the removal of water, may be produced in accordance with known processes, e.g. by a double reaction of acid addition salts of compounds of general formula I, preferably with metal salts, the cation of which forms a difficultly soluble compound with the anion of the acid addition salts of the compounds of general Formula I, or with an ion exchange resin.

In accordance with this process it is also possible to produce acid addition salts of optically active acids with the compounds of general Formula I. The resulting diastereoisomers may then be separated in accordance with known methods, e.g. by fractional crystallization.

The lower alkyl radical represented by the symbol R preferably contains 1 to 6 carbon atoms, especially 1 to 4 carbon atoms.

Pharmaceutically acceptable acid addition salts of the compounds of Formula I are useful because they possess pharmacological activity in animals. In particular, the compounds are useful antidepressants as for example indicated by their action in mice in inhibiting the ptosis and catalepsy produced by tetrabenazine and the hypothermia produced by reserpine, and also their effect in potentiating the behavioral effects produced by DOPA and in potentiating the hyperthermia caused by amphetamine. The compounds also exhibit analgesic and anorexigenic properties, but lack anticholinergic properties.

For the above-mentioned use, the dosage administered will, of course, vary depending on the compound employed, the mode of administration and the treatment desired. However, in general, satisfactory results are obtained when administered at a daily dosage of from about 0.1 to about 10 milligrams per kilogram of animal body weight. For the larger mammals, suitable total daily dosages range from about 30 to about 300 milligrams of the compound admixed with a solid or liquid pharmaceutical carrier or diluent.

The compounds of general Formula II have hitherto not been described in the literature. A compound of Formula II may be produced by condensing 1,3,4,4a,5,9b-hexahydro - 5(2H) - indeno[1,2-c]pyridinol of Formula III,

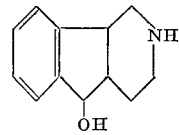

with a compound of general Formula IV,

X—CH₂—CO—R          IV in which X signifies fluorine, chlorine, bromine or iodine, and R has the above significance.

This condensation is preferably effected in the presence of a basic condensation agent, such as an inorganic base, e.g. an alkali metal carbonate, or a tertiary organic base, e.g. triethylamine, or an excess of the compound of Formula III in a solvent which is inert under the reaction conditions, e.g. a chlorinated hydrocarbon such as chloroform, or an aromatic hydrocarbon such as toluene, or in a di(lower)alkyl-carboxylic acid amide such as dimethyl formamide. It is recommendable to effect this condensation at an elevated temperature, preferably at the boiling temperature of the reaction mixture, in order to accelerate the speed of the reaction.

Isolation and, if necessary, purification of the compounds of general Formula II is effected in manner known per se.

Optically active compounds of general Formula II may be obtained by first producing the corresponding racemic compounds from mixture of the racemates, converting these racemic compounds into diastereoisomeric salts by reacting with optically active acids and separating the diastereoisomeric salts into their optically active antipodes, e.g. by fractional crystallization.

Insofar as the production of the starting materials is not described, these are known or may be produced in accordance with processes known per se or in a manner analogous to the processes described herein or to processes known per se.

In the following non-limitative examples all temperatures are indicated in degrees centigrade and are uncorrected.

EXAMPLE 1

2-acetonyl-1,3,4,9b-tetrahydro-2H-indeno[1,2-c]pyridine hydrochloride 15 g. of 2-acetonyl-1,3,4,4a,5,9b-hexahydro-5(2H)-indeno[1,2-c]pyridinol are heated under reflux with 150 cc. of 2 N hydrochloric acid for 20 minutes. After evaporation in a vacuum the residue is taken up in acetone, whereupon the title compound crystallize. 2-acetonyl-1,3,4,9b - tetrahydro-2H-indeno[1,2-c]pyridine hydrochloride has an M.P. of 242–245° (decomp.) after recrystallizing twice from ethanol.

The 2-acetonyl-1,3,4,4a,5,9b-hexahydro-5(2H) - indeno [1,2-c]pyridinol, used as starting material, may be produced as follows:

50 g. of 1,3,4,4a,5,9b-hexahydro-5(2H)-indeno[1,2-c] pyridinol, 29.4 g. of chloroacetone and 62.5 g. of anhydrous sodium carbonate are heated to the boil under reflux for 18 hours in 1200 cc. of chloroform. After cooling, the precipitate is filtered off, the filtrate is washed twice with water, is dried over magnesium sulphate and concentrated by evaporation. The residue is dissolved in acetone and filtered over 100 g. of silica gel. The silica gel is washed with acetone until complete elution occurs, the combined acetone fractions are concentrated by evaporation and the residue is crystallized twice from benzene.

The resulting 2-acetonyl-1,3,4,4a,5,9b-hexahydro-5(2H)-indeno[1,2-c]pyridinol has an M.P. of 94–96°.

EXAMPLE 2

2-(3,3-dimethyl-2-oxobutyl)-1,3,4,9b-tetrahydro-2H-indeno[1,2-c]pyridine hydrochloride 20 g. of crude 2-(3,3-dimethyl-2-oxobutyl)-1,3,4,4a,5, 9b - hexahydro - 5(2H)-indeno[1,2-c]pyridinol are boiled under reflux with 200 cc. of 5 N hydrochloric acid for 20 minutes. The reaction mixture is then concentrated in a vacuum to about 50 cc., and after cooling the title compound is filtered off. It is dried and recrystallized from ethanol/acetone. M.P. 224–227° (decomp.).

The starting materials is produced as follows: a solution of 22.3 g. of 1,3,4,4a,5,9b-hexahydro-5-(2H)-indeno [1,2-c]pyridinol and 22.3 g. of 1-chloro-3,3-dimethyl-butan-3-one in 440 cc. of chloroform is boiled under reflux in the presence of 27.6 g. of sodium carbonate for 24 hours. The reaction mixture is then shaken out with water and the chloroform solution is concentrated by evaporation after drying over magnesium sulphate. The residue is taken up in ether, whereupon unconverted 1,3,4,4a,5,9b-hexahydro-5(2H)-indeno[1,2-c]pyridinol crystallizes. The crystals are filtered off, the filtrate is shaken out several times with dilute hydrochloric acid, the extracts are made alkaline with a caustic soda solution, the precipitated base is taken up in chloroform and the chloroform solution is concentrated by evaporation after drying over magnesium sulphate. The resulting brown oil is crude 2-(3,3-dimethyl-2-oxobutyl) - 1,3,4,4a,5,9b - hexahydro-5(2H)-indeno [1,2-c]pyridinol. It is used for the next reaction without further purification.

What is claimed is:

1. A pharmaceutically acceptable acid addition salt of a compound of formula:

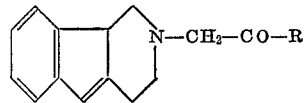

in which R is lower alkyl of 1 to 6 carbon atoms.

2. The compound of claim 1, which is 2-acetonyl-1,3,4, 9b-tetrahydro-2H-indeno[1,2-c]pyridine hydrochloride.

3. The compound of claim 1, which is 2-(3,3-dimethyl-2-oxobutyl) - 1,3,4,9b - tetrahydro - 2H-indeno[1,2-c]pyridine hydrochloride.

References Cited

UNITED STATES PATENTS

| | | | |
|---|---|---|---|
| 2,075,359 | 3/1937 | Salzberg et al. | 424—250 |
| 3,497,517 | 2/1970 | Jucker et al. | 260—294.7C |

NORMA S. MILESTONE, Primary Examiner

S. D. WINTERS, Assistant Examiner

U.S. Cl. X.R.

260—293.4, 297; 424—267